United States Patent
Kardos

(10) Patent No.: US 7,975,676 B2
(45) Date of Patent: Jul. 12, 2011

(54) COOLING ARRANGEMENT

(75) Inventor: Zoltan Kardos, Södertälje (SE)

(73) Assignee: Scania CV AB (SE)

( * ) Notice: Subject to any disclaimer, the term of this patent is extended or adjusted under 35 U.S.C. 154(b) by 118 days.

(21) Appl. No.: 12/441,564

(22) PCT Filed: Sep. 4, 2007

(86) PCT No.: PCT/SE2007/050618
§ 371 (c)(1),
(2), (4) Date: Mar. 17, 2009

(87) PCT Pub. No.: WO2008/048174
PCT Pub. Date: Apr. 24, 2008

(65) Prior Publication Data
US 2010/0083941 A1 Apr. 8, 2010

(30) Foreign Application Priority Data

Sep. 29, 2006 (SE) ..................... 0602030

(51) Int. Cl.
*F02B 47/08* (2006.01)
*F02B 47/00* (2006.01)
(52) U.S. Cl. .................. 123/568.12; 701/108
(58) Field of Classification Search ............ 123/568.12, 123/568.11, 568.22, 542, 41.56, 41.62; 701/108; 60/278, 605.1, 605.2, 320; 165/138, 139, 165/140; 24/16 R
See application file for complete search history.

(56) References Cited

U.S. PATENT DOCUMENTS

| | | | |
|---|---|---|---|
| 4,558,891 A | 12/1985 | Wagner et al. | |
| 7,707,997 B2 * | 5/2010 | Yoon | 123/568.12 |
| 2006/0278377 A1 * | 12/2006 | Martins et al. | 165/140 |
| 2007/0261400 A1 * | 11/2007 | Digele et al. | 60/320 |
| 2008/0047533 A1 | 2/2008 | Kardos | |

FOREIGN PATENT DOCUMENTS

| | | |
|---|---|---|
| SE | 527869 | 6/2006 |
| WO | WO 9942707 A1 | 8/1999 |
| WO | WO 2006040053 A1 * | 4/2006 |
| WO | WO 2006054939 A1 | 5/2006 |
| WO | WO 2006135335 A1 | 12/2006 |

OTHER PUBLICATIONS

International Search Report dated Dec. 19, 2007, issued in corresponding international application No. PCT/SE2007/050618.

* cited by examiner

*Primary Examiner* — Mahmoud Gimie
(74) *Attorney, Agent, or Firm* — Ostrolenk Faber LLP

(57) ABSTRACT

A cooler arrangement of a vehicle includes a charge air cooler which itself includes at least one pipeline for guiding compressed air during cooling and a first tank for receiving the cooled compressed air from the first pipeline, and an EGR cooler which includes at least one second pipeline for guiding exhaust gases during cooling, and a second tank operable to receive the cooled exhaust gases from the second pipeline. A mechanical connection connects an end of the first tank of the charge air cooler to an end of the second tank of the EGR cooler so that the tanks constitute a composite tank unit in a fitted state in the vehicle.

15 Claims, 1 Drawing Sheet

COOLING ARRANGEMENT

CROSS REFERENCE TO RELATED APPLICATION

The present application is a 35 U.S.C. §§371 national phase conversion of PCT/SE2007/050618, filed Sep. 4, 2007, which claims priority of Swedish Application No. 0602030-9, filed Sep. 29, 2006, the disclosure of which is incorporated by reference herein. The PCT International Application was published in the English language.

BACKGROUND OF THE INVENTION

The present invention relates to a cooler arrangement for a vehicle engine.

The amount of air which can be supplied to a supercharged combustion engine depends on the pressure of the air but also on the temperature of the air. Supplying the largest possible amount of air to the combustion engine entails cooling the compressed air in a charge air cooler before it is led to the combustion engine. The charge air cooler is often fitted in front of the vehicle's ordinary radiator, where it is cooled by surrounding air. The compressed air can thus be cooled in the charge air cooler to a temperature substantially corresponding to the temperature of the surroundings. The charge air cooler is made with advantage of a material with good heat-conducting properties such as aluminium.

The technique called EGR (Exhaust Gas Recirculation) is a known way of leading part of the exhaust gases from a combustion process in a combustion engine back, via a return line, to an inlet line for supply of air to the combustion engine. Adding exhaust gases to the air leads to a lower combustion temperature, resulting inter alia in a reduced content of nitrogen oxides $NO_x$ in the exhaust gases. It is important that the returning exhaust gases are also subjected to good cooling so that they will not heat the air which is led to the combustion engine. The exhaust gases are therefore cooled in an EGR cooler before they are mixed with the air in the inlet line. As exhaust gases contain corrosive substances, the EGR cooler is with advantage made of a corrosion-resistant material such as stainless steel.

SE 527 869 refers to an air-cooled cooler device adapted to being fitted in front of the vehicle's ordinary radiator at a front portion of a vehicle. The cooler device comprises a charge air cooler and an EGR cooler which have a common outlet tank so that they constitute a composite tank unit. Such a cooler device may be made compact and occupy little space, while at the same time the compressed air and the exhaust gases can be mixed with one another substantially immediately after they have been cooled in the respective coolers.

SUMMARY OF THE INVENTION

The object of the present invention is to provide a cooler arrangement which occupies relatively little space and is easy to fit in a vehicle, while at the same time it may comprise an EGR cooler and a charge air cooler which are made of different materials.

This object is achieved with the cooler arrangement of the invention. A cooler arrangement of a vehicle includes a charge air cooler which itself comprises at least one pipeline for guiding compressed air during cooling and a first tank for receiving the cooled compressed air from the first pipeline, and an EGR cooler which comprises at least one second pipeline for guiding exhaust gases during cooling, and a second tank operable to receive the cooled exhaust gases from the second pipeline. A mechanical connection connects an end of the first tank of the charge air cooler to an end of the second tank of the EGR cooler so that the tanks constitute a composite tank unit in a fitted state in the vehicle.

Connecting an end of the tank of the charge air cooler to an end of the tank of the EGR cooler results in said tanks constituting a composite tank unit in a fitted state in the vehicle. The result is a compact cooler arrangement which occupies little space in the vehicle. The EGR cooler and the charge air cooler may here be of substantially conventional configuration and made of any desired materials, but the connection between the tank of the charge air cooler and the tank of the EGR cooler has to be strong enough to withstand the overpressure which occurs in the tanks without giving rise to leakage. If the tank of the charge air cooler and the tank of the EGR cooler are made of different metal materials, such a connection may be difficult to set up. Connection methods such as welding and brazing are usually not usable. At the same time, the different metal materials must not be so arranged that galvanic current can occur between the metal materials of the connection. If galvanic current occurs between the metal materials of the connection, the less noble material will corrode. According to the invention, the tanks are connected by a mechanical connection. A suitably arranged mechanical connection will make it possible to set up a very strong connection between the tanks so that leakage of the compressed air and the exhaust gases is prevented. In addition, a mechanical connection can be so arranged that the different metal materials of the tanks do not come into direct contact with one another. The risk of galvanic corrosion at the connection is thus substantially eliminated. Such a mechanical connection may be a threaded connection, a bolted connection, a riveted connection etc. Such a suitably arranged mechanical connection makes it possible for the charge air cooler and the EGR cooler to be fitted together easily and effectively.

According to a preferred embodiment of the present invention, said mechanical connection is a clamping connection adapted to connecting the tank of the charge air cooler and the tank of the EGR cooler with a clamping force. A clamping connection is often easy to apply and can at the same time exert a strong clamping force which holds the tank of the charge air cooler and the tank of the EGR cooler together. The clamping connection preferably comprises a bandlike element which has an internal surface adapted to abutting with said clamping force against an external surface of the tank of the charge air cooler and an external surface of the tank of the EGR cooler in a connecting region. Such a bandlike element is thus applied round the tank of the charge air cooler and the tank of the EGR cooler in the connecting region. The bandlike element in a clamped state will exert a clamping force which holds the tanks together in a certain mutual position relative to one another in the connecting region. With advantage, the bandlike element has an internal surface with a shape corresponding to that of the external surface of the tank of the charge air cooler and the external surface of the tank of the EGR cooler in the connecting region. The external surfaces of the tank of the charge air cooler and the tank of the EGR cooler and the internal surfaces of the bandlike element are with advantage sloped so that the clamping of the bandlike element also converts to a clamping force which urges the end surfaces of the tank of the charge air cooler and the tank of the EGR cooler towards one another in the connecting region. Such surfaces make it easier to set up a strong connection between the tank of the charge air cooler and the tank of the EGR cooler. The clamping connection preferably comprises a screw means by which it is possible to adjust the tension of the bandlike element. The tension in the bandlike element can thus easily be adjusted until it exerts a desired clamping force which holds the tank of the charge air cooler and the tank of the EGR cooler securely together in the connecting region. Such a clamping connection may comprise a so-called V-clamp.

According to a preferred embodiment of the present invention, the mechanical connection comprises a connecting element positioned between the end surfaces of said tanks. The result is that there is no direct contact between the different materials of the respective tanks, thereby substantially eliminating the risk of galvanic current occurring in the connecting region. Such a connecting element may be annular and adapted to being positioned between the end surfaces of the tanks. The connecting element may be made of electrically insulating material in order to further eliminate the risk of galvanic currents occurring between the different materials. The connecting element should have certain elastic properties so that it can reliably seal between the end surfaces of the tanks.

According to a preferred embodiment of the present invention, the composite tank has a substantially vertical extent in a fitted state in the vehicle and the tank of the EGR cooler is fitted above or below the tank of the charge air cooler. The charge air cooler and the EGR cooler may here be fitted as a composite tank unit in a vehicle in front of the ordinary radiator where a cooling air flow at the temperature of the surroundings will flow through them. Thus both the compressed air in the charge air cooler and the exhaust gases in the EGR cooler will be cooled to a temperature substantially corresponding to the temperature of the surroundings. With advantage, the cooler arrangement comprises a second mechanical connection adapted to connecting an end of one of said tanks to an end of a pipeline adapted to leading the cooled mixture of air and exhaust gases away from the cooler arrangement. Such a pipeline may be made of a metal material or a more or less flexible plastic material. With advantage, the second mechanical connection used here will be of similar construction to the mechanical connection used for connecting the tank of the charge air cooler and the tank of the EGR cooler.

According to a preferred embodiment of the present invention, the tank of the EGR cooler is made of stainless steel. With advantage, the whole EGR cooler is made of stainless steel. When exhaust gases are cooled in an EGR cooler, there is risk of corrosive substances condensing inside the EGR cooler. The EGR cooler should therefore be made of a corrosion-resistant material. Stainless steel is a very corrosion-resistant material which has at the same time relatively good heat transfer properties. With advantage, the tank of the charge air cooler is made of aluminium. The compressed air will not contain corrosive substances to the same extent as the exhaust gases. The charge air cooler may therefore with advantage be made of aluminium, which has excellent heat transfer properties while at the same time being a less expensive material than stainless steel.

BRIEF DESCRIPTION OF THE DRAWING

Preferred embodiments of the invention are described below by way of examples with reference to the attached drawing, in which.

DETAILED DESCRIPTION OF A PREFERRED EMBODIMENT OF THE INVENTION

Figure 1:
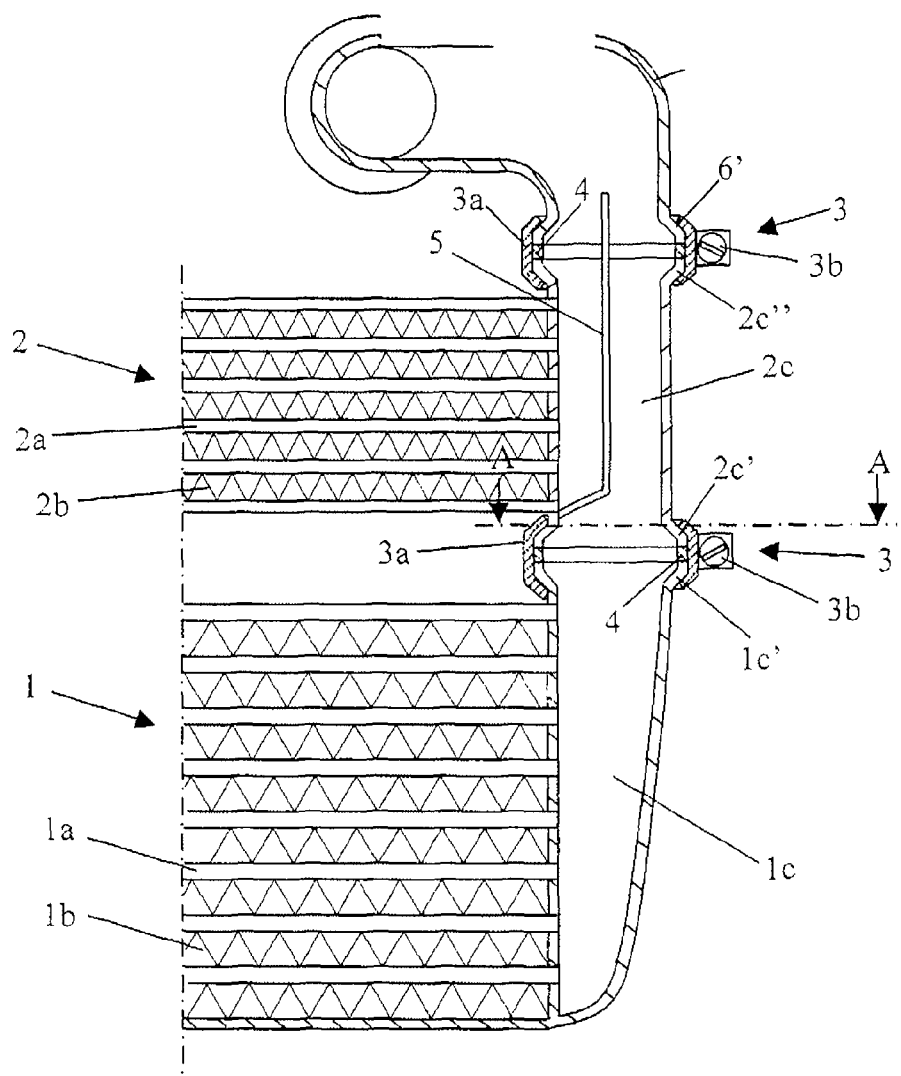
FIG. 1 depicts a cooler arrangement according to the present invention.

FIG. 1 depicts part of a cooler arrangement which comprises a charge air cooler 1 and an EGR cooler 2. The charge air cooler 1 comprises a plurality of parallel pipelines 1a intended to guide compressed air. Cooling flanges 1b are arranged in the gaps between the pipelines 1a. Air at preferably the temperature of the surroundings is adapted to flowing through the gaps between the pipelines 1a so that the compressed air which is led through the pipelines 1a is subjected to cooling by the surrounding air. The pipelines 1a and the cooling flanges 1b together constitute a substantially platelike cooling section of the charge air cooler 1. The pipelines 1a have outlet apertures which lead out at various levels into a tank 1c of the charge air cooler. The tank 1c is fastened at an end portion of the platelike cooling section. The tank 1c has the function of receiving cooled compressed air from the pipelines 1a. The charge air cooler 1 also comprises in a conventional manner an undepicted inlet tank at an opposite end portion of the platelike cooling section. The charge air cooler's pipelines 1a, cooling flanges 1b and tanks 1c are with advantage made of a material which has very good heat conducting properties, e.g. aluminium.

The EGR cooler 2 is fitted substantially vertically above the charge air cooler 1. The EGR cooler 2 comprises a plurality of parallel pipelines 2a intended to guide returned exhaust gases. Cooling flanges 2b are arranged in the gaps between the pipelines 2a. Air at the temperature of the surroundings is intended to flow through the gaps between the pipelines 2a so that the exhaust gases in the pipelines 2a are subjected to cooling. The pipelines 2a and the cooling flanges 2b together form a substantially platelike cooling section of the EGR cooler 2. The pipelines 2a have outlet apertures which lead out at various levels into a tank 2c which is fastened at an end portion of the platelike cooling section. The tank 2c has the function of receiving cooled exhaust gases from the pipelines 2a. The EGR cooler 2 also comprises in a conventional manner an undepicted inlet tank at an opposite end portion of the platelike cooling section. The pipelines 2a and the tanks 2c are with advantage made of a very corrosion-resistant material which has at the same time good heat-conducting properties. The EGR cooler 2 is therefore with advantage made of stainless steel, but the cooling flanges 2b may be made of some other material, since they are not in direct contact with the corrosive exhaust gases.

Figure 2:
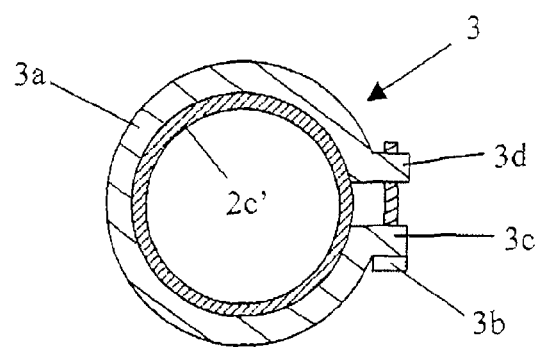
FIG. 2 depicts the mechanical connection as seen from above from the plane A-A in FIG. 1.

An upper end of the tank 1c of the charge air cooler comprises a flangelike portion 1c' pointing outwards. A lower end of the tank 2c of the EGR cooler comprises a correspondingly shaped flangelike portion 2c' likewise pointing outwards. The upper end of the tank 1c of the charge air cooler is connected to the lower end of the tank 2c of the EGR cooler by a first clamping connection in the form of a V-clamp 3 in a first connecting region. The tank 1c of the charge air cooler and the tank 2c of the EGR cooler thus constitute a composite tank unit in a fitted state in the vehicle. A sectional view of the V-clamp 3 appears in FIG. 2. The V-clamp 3 comprises a bandlike element 3a which in a fitted state is adapted to substantially extending round the flangelike portion 1c' of the tank 1c of the charge air cooler and the flangelike portion 2c' of the tank 2c of the EGR cooler. The V-clamp 3 has an internal surface substantially corresponding in shape to the external surfaces of the flangelike portions 1c', 2c'. The V-clamp 3 comprises a screw means 3b with a head and a threaded portion which extends through an unthreaded hole in a first portion 3c of the bandlike element 3a into a threaded hole in a second portion 3d of the bandlike element 3a. An annular element 4 is positioned between the end surfaces 1c, 2c of the tanks in the first connecting region so that the end surfaces are not in direct contact with one another. The annular element 4 is with advantage made of an electrically insulating material. The risk of galvanic currents occurring between the tanks 1c, 2c in the first connecting region is thus eliminated despite their being made of different metal materials.

A wall element 5 is arranged within the tank 2c of the EGR cooler. When the exhaust gases are cooled in the EGR cooler, there is risk of corrosive substances in the exhaust gases condensing within the EGR cooler 2. The object of the wall element 5 is to prevent corrosive substances in the exhaust gases, mainly in the form of condensates, from running down and accumulating in the tank 1c of the charge air cooler, which may therefore be made of aluminium. Aluminium is a material which is not totally resistant to such substances. The cooler arrangement also comprises, in a second connecting region, a second clamping connection adapted to connecting an upper end of the tank 2c of the EGR cooler to an end of a pipeline 6 adapted to leading the cooled mixture of air and exhaust gases away from the cooler arrangement. The upper end of the tank 2c of the EGR cooler comprises a flangelike portion 2c″ pointing outwards, and the end of the pipeline 6 comprises a correspondingly shaped flangelike portion 6′ likewise pointing outwards. The second clamping connection comprises a V-clamp 3 similar to that used in the first connecting region. Here again the V-clamp 3 comprises a bandlike element 3a which has an internal surface corresponding in shape to the external surfaces of the flangelike portions 2c″, 6′ pointing outwards in the second connecting region. Here again an annular element 4 is positioned between the end surfaces of the tank 2c of the EGR cooler and the pipeline 6 so that the end surfaces do not come into direct contact with one another.

The first V-clamp 3 is thus used for connecting the tank 1c of the charge air cooler and the tank 2c of the EGR cooler in the first connecting region. When the V-clamp 3 is to be applied, the bandlike element 3a is arranged in such a position that it extends round the flangelike portion 1c′ of the tank 1c of the charge air cooler and the flangelike portion 2c′ of the tank 2c of the EGR cooler. Thereafter, the screw means 3b is screwed into the threaded hole in the second portion 3d so that the distance between the first portion 3c and the second portion 3d is reduced. Tightening the bandlike element 3a gradually tensions it round the external surfaces of the flangelike portions 1c′, 2c′. When the bandlike element 3a has applied sufficient tension, the bandlike element 3a holds the flangelike portions 1c′, 2c′ together with great clamping force. The external surfaces of the flangelike portions 1c′, 2c′ and the internal surfaces of the bandlike element 3a are angled so that part of said clamping force acts in such a direction that the end surfaces 1c, 2c of the tanks are each urged, from their respective side, towards the intermediate annular element 4. It is thus relatively easy to provide a very strong and secure connection between the tank 1c of the charge air cooler and the tank 2c of the EGR cooler. In the assembled state, the tank 1c of the charge air cooler and the tank 2c of the EGR cooler constitute a composite tank unit. The result is a compact cooler arrangement which occupies little space in the vehicle. The second V-clamp 3 is used thereafter in a similar way to connect the tank 2c of the EGR cooler to the pipeline 6 in the second connecting region. The cooler arrangement can thus be very easily and quickly fitted in a vehicle.

The invention is in no way limited to the embodiment to which the drawing refers but may be varied freely within the scopes of the claims. For example, the charge air cooler may alternatively be fitted above instead of below the EGR cooler. The mechanical connection is exemplified above as a V-clamp but other types of mechanical connection, e.g. threaded connection, bolted connection, riveted connection etc., may also be used.

The invention claimed is:

1. A cooler arrangement for a vehicle, comprising:
a charge air cooler which comprises at least one first pipeline operable for guiding compressed air during cooling of the compressed air and a first tank positioned and operable to receive the cooled compressed air from the first pipeline, the first tank having a first end;
an EGR cooler which comprises at least one second pipeline positioned and operable for guiding exhaust gases during cooling of the exhaust gases and a second tank positioned and operable to receive the cooled exhaust gases from the second pipeline, the second tank having a second end;
a mechanical connection connecting the first end of the first tank of the charge air cooler to the second end of the second tank of the EGR cooler so that the tanks constitute a composite tank unit in a fitted state in the vehicle; and
an intermediate element comprising an electrically insulating material interposed between the first end of the first tank and the second end of the second tank to prevent direct contact between the first and second tanks.

2. A cooler arrangement according to claim 1, wherein the mechanical connection comprises a clamping connection operable for connecting the first tank of the charge air cooler and the second tank of the EGR cooler with a clamping force.

3. A cooler arrangement according to claim 2, wherein the clamping connection comprises a band element which has an internal surface abutting with clamping force against an external surface of the first tank of the charge air cooler and against an external surface of the second tank of the EGR cooler at a connecting region.

4. A cooler arrangement according to claim 3, wherein the band element has an internal surface substantially corresponding in shape to an external surface of the first tank of the charge air cooler and to an external surface of the second tank of the EGR cooler in the connecting region.

5. A cooler arrangement according to claim 3, wherein the clamping connection comprises a screw at the band element operable to adjust the clamping force of the band element.

6. A cooler arrangement according to claim 1, wherein the composite tank is configured to have a substantially vertical extent in a fitted state in the vehicle, and the second tank of the EGR cooler is fitted above or below the first tank of the charge air cooler.

7. A cooler arrangement according to claim 1, further comprising a mechanical connection connecting the end of one of the tanks to an end of a pipeline which is operable to leading the cooled mixture of air and exhaust gases away from the cooler arrangement.

8. A cooler arrangement according to claim 1, wherein the second tank of the EGR cooler is made of stainless steel.

9. A cooler arrangement according to claim 8, wherein the first tank of the charge air cooler is made of aluminum.

10. A cooler arrangement according to claim 1, wherein the first tank of the charge air cooler is made of aluminum.

11. A cooler arrangement according to claim 1, wherein the intermediate element is configured and operative to impede the flow of galvanic currents between the first and second tanks.

12. A cooler arrangement according to claim 1, wherein the first end of the first tank has an outwardly flared flange portion, and the second end of the second tank has an outwardly flared flange portion of corresponding size and shape to the first end of the first tank.

13. A cooler arrangement according to claim 12, wherein the clamping connection comprises a band element which has an internal surface abutting with clamping force against an external surface of the first tank of the charge air cooler and against an external surface of the second tank of the EGR cooler at a connecting region.

14. A cooler arrangement according to claim 13, wherein the band element has an internal surface substantially corresponding in shape to an external surface of the first tank of the charge air cooler and to an external surface of the second tank of the EGR cooler in the connecting region.

15. A cooler arrangement according to claim 13, wherein the clamping connection comprises a screw at the band element operable to adjust the clamping force of the band element.

* * * * *